US012784512B2

(12) United States Patent
Kawaura et al.

(10) Patent No.: US 12,784,512 B2
(45) Date of Patent: Nov. 3, 2026

(54) VIDEO RECORDING SYSTEM AND VIDEO RECORDING METHOD

(71) Applicant: HONDA MOTOR CO., LTD., Tokyo (JP)

(72) Inventors: Kohji Kawaura, Tokyo (JP); Naoyuki Urushizaki, Tokyo (JP); Fumio Yamashita, Tokyo (JP); Yuichi Oneda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 18/917,582

(22) Filed: Oct. 16, 2024

(65) Prior Publication Data

US 2025/0140031 A1 May 1, 2025

(30) Foreign Application Priority Data

Oct. 27, 2023 (JP) ................................ 2023-184817

(51) Int. Cl.
*G07C 5/00* (2006.01)
*G07C 5/08* (2006.01)

(52) U.S. Cl.
CPC .......... *G07C 5/008* (2013.01); *G07C 5/0858* (2013.01); *G07C 5/0866* (2013.01)

(58) Field of Classification Search
None
See application file for complete search history.

(56) References Cited

U.S. PATENT DOCUMENTS 12,513,263 B2 * 12/2025 Roberson .............. H04N 7/181
2002/0161856 A1 * 10/2002 Pineau .............. H04N 1/00137 709/219

(Continued)

FOREIGN PATENT DOCUMENTS

JP 6-53973 A 2/1994
JP 2003-34236 A 2/2003
JP 2009-77038 A 4/2009

(Continued)

OTHER PUBLICATIONS

Japanese Office Action dated Aug. 25, 2026, issued in the corresponding Japanese Application No. 2023-184817; English machine translation included; 7 pages.

*Primary Examiner* — Heather R Jones
(74) *Attorney, Agent, or Firm* — Rankin, Hill & Clark LLP

(57) ABSTRACT

This video recording system includes: a recording unit that saves a video file of surroundings of a mobile unit; a transmission control unit that transmits the video file to an external device; a management unit that manages transmission of the video file. The recording unit associates an ascending file number with the video file in ascending order of capture time, and stores the video file and file number in the storage device. The transmission control unit assigns the associated file number to the video file, and transmits the video file to the external device. At predetermined timing, the management unit instructs the transmission control unit to transmit an unreceived video file at the external device, on the basis of the file number associated with the video file last transmitted by the transmission control unit and the file number assigned to the video file last received by the external device.

6 Claims, 5 Drawing Sheets

(56) References Cited

U.S. PATENT DOCUMENTS

| | | | | |
|---|---|---|---|---|
| 2008/0091687 | A1* | 4/2008 | Watanabe | H04L 67/06 |
| 2019/0364403 | A1* | 11/2019 | Abari | G01S 13/931 |

FOREIGN PATENT DOCUMENTS

| | | | |
|---|---|---|---|
| JP | 2014206809 | A | 10/2014 |
| JP | 2017-224242 | A | 12/2017 |
| JP | 2022131099 | A | 9/2022 |

* cited by examiner

VIDEO RECORDING SYSTEM AND VIDEO RECORDING METHOD

INCORPORATION BY REFERENCE

The present application claims priority under 35 U.S.C. § 119 to Japanese Patent Application No. 2023-184817 filed on Oct. 27, 2023. The content of the application is incorporated herein by reference in its entirety.

BACKGROUND

Technical Field

The present invention relates to a video recording system and a video recording method.

Related Art

In recent years, research and development on vehicle safety has been conducted to further improve traffic safety and contribute to the development of a sustainable transportation system.

JP 2009-77038 A discloses a broadcast data storage system equipped with a server that receives and accumulates recorded broadcast data from each vehicle that receives and records the broadcast data. In this system, in response to a request from a vehicle that has lost part of the broadcast data record due to movement out of the broadcast range, the server transmits the missing part of the broadcast data to the vehicle.

JP 2017-224242 A describes an information provision device in which, when a vehicle is about to enter outside the communication range of a network, a map distribution server transmits proposal information extracted according to predetermined extraction conditions to the vehicle.

In addition, JP 2003-34236 A discloses a theft detection device for vehicles. When a vehicle-mounted sensor detects a theft, this device uses a notification means to make a notification to a monitoring center via a mobile phone system. Further, when a vehicle is parked, the parking position is out of the range of the mobile phone system, and the notification means is not available, this device outputs a notification sound to the user with a vehicle-mounted siren.

SUMMARY

Meanwhile, in improving vehicle safety, it is a problem to reliably provide a user with a video image of the surroundings of the vehicle in an abnormal situation such as a vehicle theft.

In order to address the above problem, the present application aims to enable an external device to receive a video image of the surroundings of a mobile unit without omission, even when a communication interruption period may occur between the mobile unit and the external device during the transmission of the surrounding video image from the mobile unit to the external device. This also aims to further improve traffic safety and contribute to the development of a sustainable transportation system.

One aspect of the present invention is a video recording system including: a recording unit that saves a video file containing a video image of surroundings of a mobile unit to a storage device mounted on the mobile unit; a transmission control unit that transmits the video file to an external device disposed outside the mobile unit; and a management unit that manages transmission of the video file. The recording unit associates an ascending file number with the video file in ascending order of capture time, and stores the video file and the file number in the storage device. The transmission control unit assigns the file number associated with the video file to the video file and transmits the video file with the file number to the external device. The management unit identifies, at predetermined timing, an unreceived video file that has not been received by the external device, on the basis of the file number associated with the video file last transmitted by the transmission control unit and the file number assigned to the video file last received by the external device, and instructs the transmission control unit to transmit the unreceived video file.

In another aspect of the present invention, the recording unit and the management unit may be provided in the mobile unit.

In another aspect of the present invention, preferably, the transmission control unit communicates with the external device via a communication network disposed outside the mobile unit, and the predetermined timing is when power of the mobile unit is switched from an on state to an off state and the transmission control unit and the communication network are in a communicable state.

In another aspect of the present invention, the storage device may be a memory removably connected to a device mounted on the mobile unit.

In another aspect of the present invention, preferably, the management unit receives the file number assigned to the video file received by the external device, the file number being returned by the external device when the transmission control unit transmits the video file to the external device, and the management unit identifies the unreceived video file that has not been received by the external device, on the basis of the file number associated with the video file last transmitted by the transmission control unit and the file number last returned from the external device.

In another aspect of the present invention, preferably, the management unit acquires, at the predetermined timing, from the external device, information related to the file number assigned to the video file last received by the external device, and identifies the unreceived video file that has not been received by the external device, on the basis of the file number associated with the video file last transmitted by the transmission control unit and the file number obtained from the external device and assigned to the video file last received by the external device.

Another aspect of the present invention is a video recording method executed by a computer of a video recording system, the video recording method including: a first step for saving a video file containing a video image of surroundings of a mobile unit to a storage device mounted on the mobile unit; a second step for transmitting the video file to an external device disposed outside the mobile unit; and a third step for managing transmission of the video file. In the first step, an ascending file number is associated with the video file in ascending order of capture time, and the video file and the file number are stored in the storage device. In the second step, the file number associated with the video file is assigned to the video file, and the video file with the file number is transmitted to the external device. In the third step, at predetermined timing, an unreceived video file that has not been received by the external device is identified on a basis of the file number associated with the video file last transmitted in the second step and the file number assigned to the video file last received by the external device, and the unreceived video file is transmitted to the external device.

The present invention enables an external device to receive a video image of the surroundings of a mobile unit without omission, even when a communication interruption period may occur between the mobile unit and the external device during the transmission of the surrounding video image from the mobile unit to the external device.

DETAILED DESCRIPTION

1. Embodiment

Hereinafter, an embodiment of the present invention will be described with reference to the drawings.

[1.1 Configuration of Video Recording System]

Figure 1:
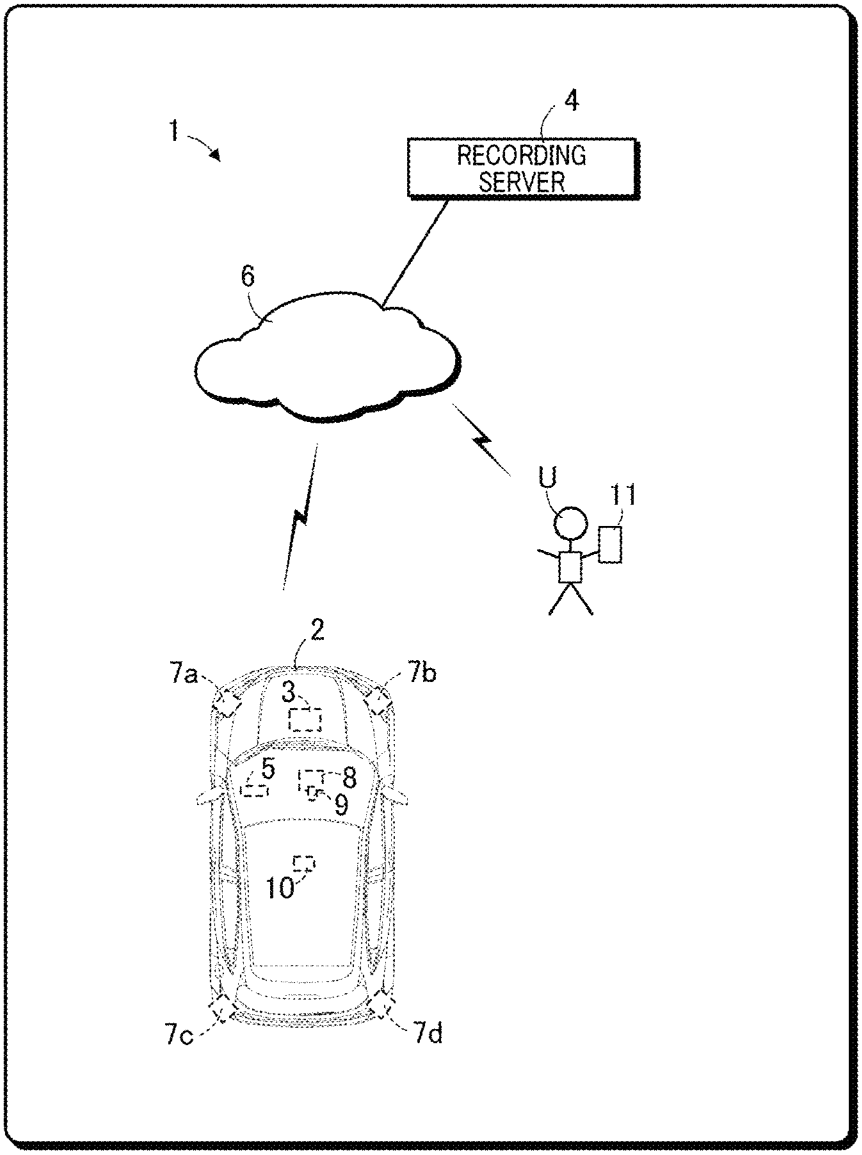
FIG. 1 illustrates a configuration of a video recording system according to an embodiment of the present invention.

FIG. 1 illustrates a configuration of a video recording system 1 according to an embodiment of the present invention. The video recording system 1 includes a video acquisition device 3 provided in a mobile unit 2, and a recording server 4. The video acquisition device 3 is communicably connected to the recording server 4 via a communication network 6 by, for example, a first communication device 5 (transmitter/receiver, circuit) of the mobile unit 2. Here, the recording server 4 corresponds to an external device disposed outside the mobile unit in the present embodiment.

In the present embodiment, the mobile unit 2 is, for example, a vehicle. However, the mobile unit 2 is not limited to the vehicle, but can be any mobile body. The mobile unit 2 may be, for example, a land mobile unit such as a passenger car, bus, or taxi, a marine mobile unit such as a ship or submarine, an aerial mobile unit such as an aircraft including an electric vertical take-off and landing (eVTOL) aircraft, or airship, or a space mobile unit such as a spaceship or artificial satellite.

The video acquisition device 3 acquires a video image of the surroundings of the mobile unit 2 (hereinafter also referred to as surrounding video). In the present embodiment, the video acquisition device 3 includes a front left camera 7*a*, front right camera 7*b*, rear left camera 7*c*, and rear right camera 7*d* of the mobile unit 2. The front left camera 7*a*, the front right camera 7*b*, the rear left camera 7*c*, and the rear right camera 7*d* are arranged on the body of the mobile unit 2, and capture images of surrounding areas on the front left, front right, rear left, and rear right sides, respectively, of the mobile unit 2. Hereinafter, the front left camera 7*a*, the front right camera 7*b*, the rear left camera 7*c*, and the rear right camera 7*d* are also collectively referred to as a camera 7.

The video acquisition device 3 also stores the acquired surrounding video as a video file in a storage device when a predetermined event occurs. In the present embodiment, the storage device is, for example, a storage device 9 removably attached to an audio-visual device 8 of the mobile unit 2. The audio-visual device 8 is, for example, a so-called display audio, and the storage device 9 is, for example, a USB memory.

In addition, in the present embodiment, the predetermined event is, for example, the theft of the mobile unit 2. More specifically, the predetermined event is the output of a security alarm from a security device 10 (computer) provided in the mobile unit 2. For example, the security device 10 has an immobilizer function and/or a vehicle body impact detection function, and, in accordance with the related art, outputs a security alarm upon detecting the use of an unauthorized vehicle key or impact and/or vibration on the vehicle body due to the theft of the mobile unit 2.

The video acquisition device 3 stores the video files in the storage device 9 in time series every time the predetermined event occurs.

The video acquisition device 3 transmits the video files to the recording server 4 in parallel with storing the video files in the storage device 9. The recording server 4 saves the received video files to a storage device (described later) of the recording server 4.

Upon receiving a video file from the video acquisition device 3 of the mobile unit 2, the recording server 4 transmits the notification to a terminal device 11 of the user U of the mobile unit 2. The above notification may be an alarm notification of a possible theft of the mobile unit 2. The terminal device 11 is, for example, a mobile terminal such as a smartphone.

In response to the receipt of an alarm notification from the recording server 4 by the terminal device 11, the user U transmits a request for transmitting the surrounding video of the mobile unit 2 from the terminal device 11 to the recording server 4. In response to receiving the transmission request, the recording server 4 transmits, to the terminal device 11, the video file received from the video acquisition device 3 of the mobile unit 2 and stored therein. The user U can use the terminal device 11 to play the video file received from the recording server 4 and view the surrounding image of the mobile unit 2. Here, communication between the recording server 4 and the terminal device 11 can be performed via the communication network 6.

[1.2 Configuration of Video Acquisition Device]

Figure 2:
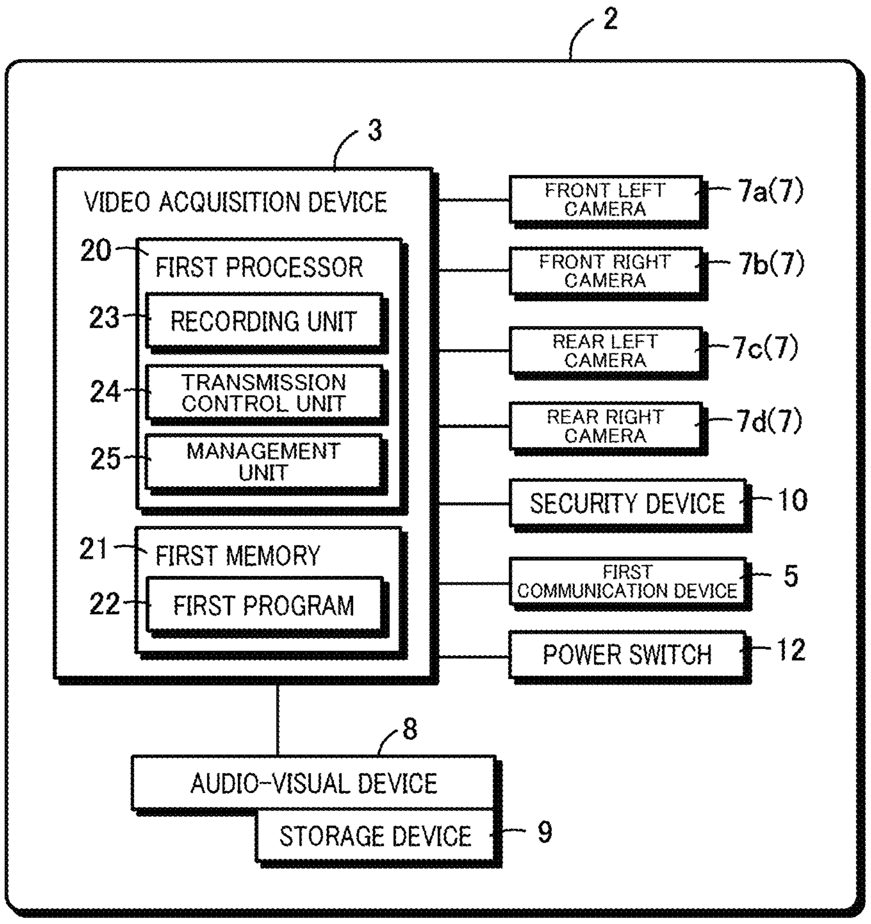
FIG. 2 illustrates a configuration of a video acquisition device provided in a mobile unit, the video acquisition device constituting the video recording system.

FIG. 2 illustrates a configuration of the video acquisition device 3 mounted on the mobile unit 2.

The video acquisition device 3 includes a first processor 20 and a first memory 21. The first memory 21 is, for example, a volatile and/or nonvolatile semiconductor memory. The first processor 20 is, for example, a computer including a CPU and the like. The first processor 20 may have a configuration having a ROM in which a program is written, a RAM for temporary storage of data, and the like. In addition, the first processor 20 includes a recording unit 23, a transmission control unit 24, and a management unit 25 as functional elements or functional units.

The functional elements of the first processor 20 are implemented, for example, by the first processor 20, which is a computer, executing a first program 22 saved in the first memory 21. Note that the first program 22 can be stored in any computer-readable storage medium. Alternatively, all or some of the above functional elements of the first processor 20 may be configured by hardware containing one or more electronic circuit components.

The recording unit 23 saves a video file containing the surrounding video of the mobile unit 2 to the storage device mounted on the mobile unit 2. In the present embodiment, the storage device described above is the storage device 9 which is a memory removably connected to the audio-visual device 8.

Therefore, by replacing the removable storage device 9, the storage capacity for saving video files can always be ensured.

Specifically, the recording unit 23 receives the surrounding video, which is a video image of the surroundings of the mobile unit 2, from the camera 7 mounted on the mobile unit 2. Then, when a predetermined event occurs, the recording unit 23 stores the surrounding video received from the camera 7 in the storage device 9 in time series as a video file. As described above, in the present embodiment, the predetermined event is, for example, the theft of the mobile unit 2, specifically, when a security alarm is received from the security device 10 provided in the mobile unit 2. The audio-visual device 8 can save the video file to the storage device 9 according to an instruction from the recording unit 23.

Here, the surrounding video stored in the storage device 9 as a video file can be, for example, the video for a predetermined period of time length (for example, 10 minutes) after receiving the security alarm from the security device 10.

In the present embodiment, in particular, the recording unit 23 associates an ascending file number with each video file in ascending order of capture time, and stores the video file and the file number in the storage device 9. For example, when saving a new video file to the storage device 9, the recording unit 23 generates a new file number by adding 1 to the file number of the video file saved immediately before, and associates the new file number with the new video file. The recording unit 23 then saves the new video file and the new file number to the storage device 9.

The transmission control unit 24 transmits the video file saved to the storage device 9 by the recording unit 23 to the recording server 4 via the first communication device 5 provided in the mobile unit 2. For example, when the recording unit 23 saves a video file to the storage device 9, the transmission control unit 24 transmits the saved video file to the recording server 4.

In the present embodiment, in particular, the transmission control unit 24 assigns, to a video file, the file number associated with the video file and stored in the storage device 9, and transmits the video file with the file number to the recording server 4.

As described above, the video acquisition device 3 including the transmission control unit 24 and the recording server 4 are communicably connected via the communication network 6. That is, the transmission control unit 24 transmits the video file to the recording server 4 via the communication network 6.

Meanwhile, the mobile unit 2 including the video acquisition device 3 can also move to locations where good communication with the communication network 6 is not possible (for example, in buildings where radio waves are difficult to reach or places far from a radio tower). As a result, depending on the location of the mobile unit 2, there may be a case where the video file cannot be transmitted from the transmission control unit 24 or a case where the recording server 4 cannot appropriately receive the video file transmitted by the transmission control unit 24.

Therefore, in the present embodiment, in particular, the management unit 25 manages the transmission of video files so that all of the video files transmitted by the transmission control unit 24 are received and saved by the recording server 4. Specifically, at predetermined timing, the management unit 25 identifies an unreceived video file that has not been received by the recording server 4, on the basis of the file number assigned to the video file last transmitted by the transmission control unit 24 and the file number assigned to the video file last received by the recording server 4. Then the management unit 25 instructs the transmission control unit 24 to transmit the unreceived video file.

Here, the above predetermined timing is, for example, when the power of the mobile unit 2 is switched from the on state to the off state and the transmission control unit 24 and the communication network 6 are in a communicable state. "When the power of the mobile unit 2 is switched from the on state to the off state" means, specifically, when a power switch 12 (FIG. 2) of the mobile unit 2 is switched from the on state to the off state. Further, "when the transmission control unit 24 and the communication network 6 are in a communicable state" specifically refers to when the mobile unit 2 including the transmission control unit 24 is within the communication range of the communication network 6. Here, "within the communication range" means within a geographical area where the strength of the communication radio waves of the communication network 6 is strong enough to allow normal or good communication. For example, the transmission control unit 24 measures the radio field intensity of radio waves being received from the communication network 6, and the management unit 25 can determine that the transmission control unit 24 and the communication network 6 are in a communicable state when the radio field intensity is a predetermined threshold value or more.

As a result, even if a communication interruption period may occur between the mobile unit 2 and the recording server 4, the video files not yet received by the recording server 4 can be easily identified at predetermined timing, so that the recording server 4 can receive the surrounding video of the mobile unit 2 without omission.

Specifically, the management unit 25 can identify a video file not yet received by the recording server 4 as follows.

For example, the management unit 25 receives information related to the file number assigned to the video file received by the recording server 4, the file number being returned by the recording server 4 when the transmission control unit 24 transmits the video file to the recording server 4. Then the management unit 25 identifies an unreceived video file that has not been received by the recording server 4, on the basis of the file number assigned to the video file last transmitted by the transmission control unit 24 and the file number last returned from the recording server 4.

More specifically, the management unit 25 identifies, as a video file not yet received by the recording server 4, the video file associated with a file number of a value greater than the last-returned file number from the recording server 4 among the video files stored in the storage device 9.

Thus, when the predetermined timing arrives, it is possible to identify a video file not yet received by the recording server 4, without communicating with the recording server 4 again.

Alternatively, the management unit 25 may acquire, at the above-described predetermined timing, from the recording server 4, information related to the file number assigned to the video file last received by the recording server 4. For example, when the predetermined timing arrives, the management unit 25 transmits a file number information request to the recording server 4, and in response to receiving the file number information request, the recording server 4 returns information related to the file number assigned to the video file last received by the recording server 4 to the video acquisition device 3.

Then, on the basis of the file number assigned to the video file last transmitted by the transmission control unit 24 and the file number assigned to the video file last received by the recording server 4 as acquired from the recording server 4, the management unit 25 identifies an unreceived video file that has not been received by the recording server 4, in the same manner as described above.

Consequently, it is possible to more reliably identify a video file not yet received by the recording server 4, through communication with the recording server 4.

Note that the transmission control unit 24 stores the file number assigned to the last-transmitted video file in the first memory, and the management unit 25 can read and use the file number as necessary.

[1.3 Configuration of Recording Server]

Figure 3:
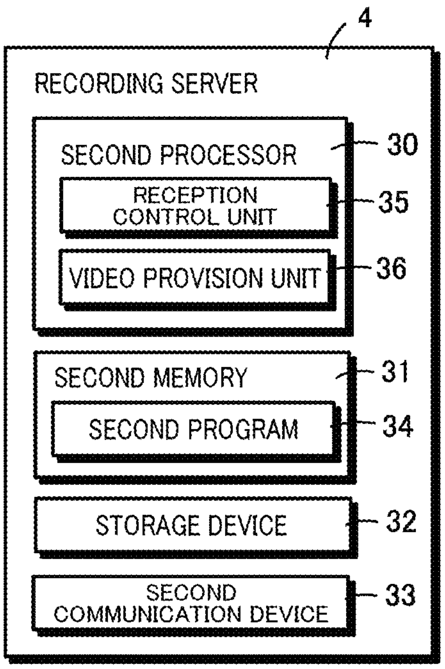
FIG. 3 illustrates a configuration of a recording server which is an external device constituting the video recording system.

FIG. 3 illustrates a configuration of the recording server 4.

The recording server 4 includes a second processor 30, a second memory 31, a storage device 32, and a second communication device 33. The second memory 31 is, for example, a volatile and/or nonvolatile semiconductor memory. The storage device 32 is, for example, a hard disk device (HDD), a solid state drive (SSD), or the like. The second communication device 33 is a transmission/reception device (transmitter/receiver, circuit) for communicating with the video acquisition device 3 of the mobile unit 2 and the terminal device 11 via the communication network 6.

The second processor 30 is, for example, a computer including a CPU and the like. The second processor 30 may have a configuration having a ROM in which a program is written, a RAM for temporary storage of data, and the like. In addition, the second processor 30 has a reception control unit 35 and a video provision unit 36 as functional elements or functional units.

The functional elements of the second processor 30 are implemented, for example, by the second processor 30, which is a computer, executing a second program 34 saved in the second memory 31. Note that the second program 34 can be stored in any computer-readable storage medium. Alternatively, all or some of the above functional elements of the second processor 30 may be configured by hardware containing one or more electronic circuit components.

The reception control unit 35 receives a video file and the file number assigned to the video file from the video acquisition device 3 of the mobile unit 2, and saves the received video file and file number in association with each other to the storage device 32. Upon receiving a video file from the video acquisition device 3 of the mobile unit 2, the reception control unit 35 may return information related to the file number assigned to the received video file to the video acquisition device 3 which is a transmission source of the video file.

Further, upon receiving the video file from the video acquisition device 3 of the mobile unit 2, the reception control unit 35 transmits the notification to the terminal device 11 of the user U of the mobile unit 2. As described above, the above notification may be an alarm notification of a possible theft of the mobile unit 2.

Further, upon receiving a file number information request from the video acquisition device 3 of the mobile unit 2, the reception control unit 35 may transmit information related to the file number assigned to the video file last received by the recording server 4 to the video acquisition device 3.

Upon receiving a transmission request for the surrounding video of the mobile unit 2 from the terminal device 11 of the user U, the video provision unit 36 reads the video file last received from the video acquisition device 3 of the mobile unit 2 from the storage device 32 and transmits the video file to the terminal device 11.

[1.4 Configuration of Terminal Device]

Figure 4:
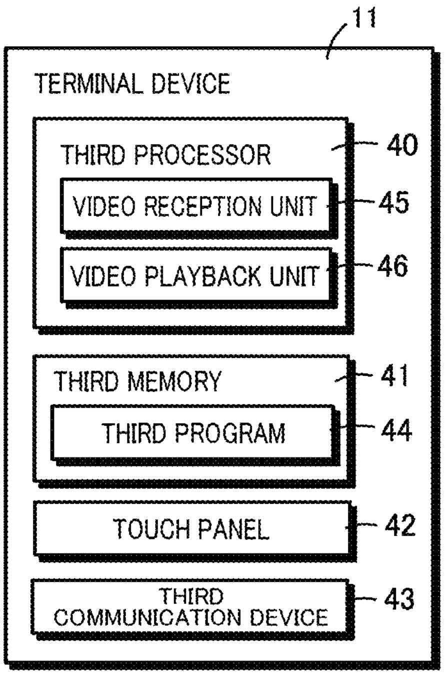
FIG. 4 illustrates a configuration of a terminal device constituting the video recording system.

FIG. 4 illustrates the configuration of the terminal device 11. As described above, in the present embodiment, the terminal device 11 is a mobile terminal such as a smartphone.

The terminal device 11 includes a third processor 40, a third memory 41, a touch panel 42, and a third communication device 43. The third memory 41 is, for example, a volatile and/or nonvolatile semiconductor memory. The third communication device 43 is a transmitter/receiver (circuit) for the terminal device 11 to communicate with another device via the communication network 6.

The third processor 40 is, for example, a computer including a CPU and the like. The third processor 40 may have a configuration having a ROM in which a program is written, a RAM for temporary storage of data, and the like. In addition, the third processor 40 has a video reception unit 45 and a video playback unit 46 as functional elements or functional units.

The functional elements of the third processor 40 are implemented, for example, by the third processor 40, which is a computer, executing a third program 44 saved in the third memory 41. Note that the third program 44 can be stored in any computer-readable storage medium. Alternatively, the third program 44 can be downloaded from a server device (not illustrated) connected to the communication network 6.

The third program 44 is, for example, an application program for playing back video information. Hereinafter, the application started by the execution of the third program 44 is referred to as a video playback application. The terminal device 11 displays a start icon for the video playback application on the touch panel 42 in accordance with the related art, and when the corresponding start icon is operated, the third program 44 is executed to implement the video reception unit 45 and the video playback unit 46 in the third processor 40.

The terminal device 11 receives a notification (for example, an alarm notification) transmitted when the recording server 4 receives a video file. For example, the terminal device 11, which is a mobile terminal such as a smartphone, receives the above notification before the third program 44 is activated, and displays the notification as a push notification on touch panel 42. The push notification can be performed, for example, as processing of a resident program executed in the terminal device 11 in accordance with the related art.

In response to the display of the push notification, the user U activates the video playback application by operating the start icon displayed on the touch panel 42, and causes the terminal device 11 to execute the third program 44.

In accordance with a reception instruction input by the user U using the touch panel 42, the video reception unit 45 requests the recording server 4 to transmit the latest video file (i.e., the video file last received by the recording server 4 from the video acquisition device 3), and receives the latest video file.

The video playback unit 46 displays, on the touch panel 42, the surrounding video of the mobile unit 2 contained in the received latest video file, in accordance with the playback instruction input by the user U using the touch panel 42.

[1.5 Operation of Video Recording System]

Figure 5:
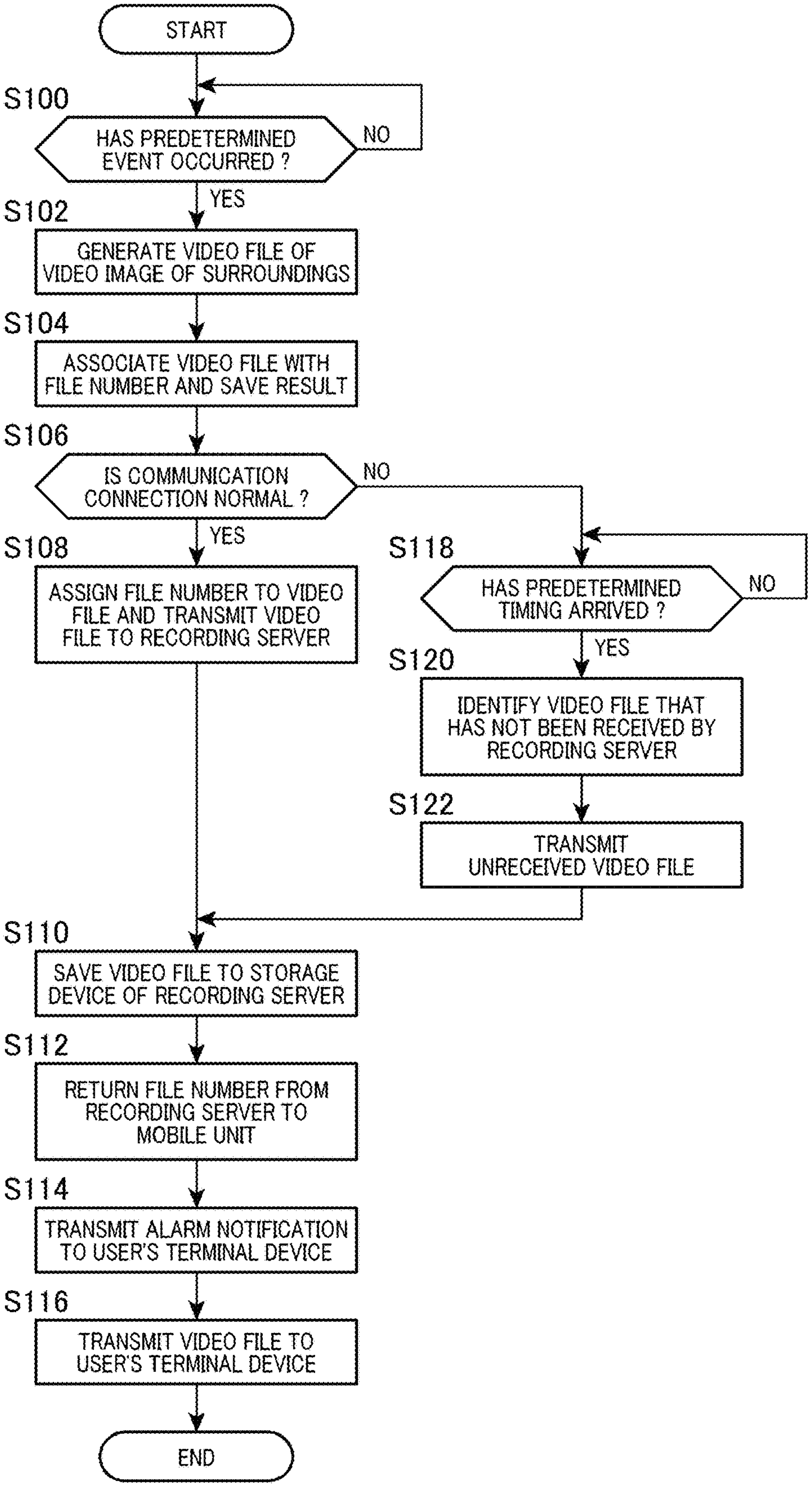
FIG. 5 is a flowchart illustrating the procedure of the operation of the video recording system.

Next, operational procedures in the video recording system 1 will be described. FIG. 5 is a flowchart illustrating the procedure of a video recording method executed by the first processor 20 of the video acquisition device 3 and the second processor 30 of the recording server 4, which are the computers of the video recording system 1, in cooperation with each other. The processing illustrated in FIG. 5 starts when the video acquisition device 3 of the mobile unit 2 and the recording server 4 is powered on, and is repeatedly executed. Note that it is assumed that the power of the video acquisition device 3 is turned on at the time of shipment of the mobile unit 2 or the like, and the operation is continued even while the power switch 12 of the mobile unit 2 is turned off. In addition, it is assumed that the video acquisition device 3 constantly receives the surrounding video of the mobile unit 2 from the camera 7 in parallel with the processing illustrated in FIG. 5.

When the processing is started, first, the recording unit 23 of the video acquisition device 3 determines whether or not a predetermined event has occurred (S100). In the present embodiment, specifically, the recording unit 23 determines whether or not a security alarm has been received from the security device 10.

Then, when the predetermined event does not occur (S100, NO), the recording unit 23 returns to step S100 and repeats the processing, and waits for the predetermined event to occur.

Meanwhile, when the predetermined event occurs (S100, YES), the recording unit 23 starts recording the surrounding video of the mobile unit 2 acquired from the camera 7, and generates a video file containing the surrounding video for a predetermined period (for example, 10 minutes) from the occurrence of the predetermined event (in the present embodiment, reception of a security alarm from the security device 10) (S102). Note that the recording unit 23 may transmit a notification to the terminal device 11 of the user U when the predetermined event occurs.

Subsequently, the recording unit 23 generates a file number for the video file generated in step S102, associates the video file with the generated file number, and saves the result to the storage device 9 (S104). As described above, the recording unit 23 generates and associates an ascending file number with the video file in ascending order of capture time.

The recording unit 23 may save the generated file number to the first memory 21. When a new video file is subsequently saved to the storage device 9, the recording unit 23 can read the saved file number from the first memory 21 and generate a number obtained by adding 1 to the read file number as the file number of the new video file.

Next, the transmission control unit 24 determines whether or not the communication connection with the communication network 6 is normal (that is, whether or not the communication connection is lost) (S106). Then, when the communication connection is not lost, that is, when the communication connection is normal (S106, YES), the transmission control unit 24 reads the video file and file number saved by the recording unit 23 in step S104 from storage device 9, assigns the read file number to the read video file, and transmits the video file to the recording server 4 (S108). The reception control unit 35 of the recording server 4 receives the video file and the file number, and saves the received video file and file number to the storage device 32 (S110). Further, the reception control unit 35 returns the file number assigned to the received video file to the video acquisition device 3 of the mobile unit 2 (S112).

Subsequently, the reception control unit 35 transmits an alarm notification to the terminal device 11 of the user U (S114). Subsequently, the reception control unit 35 transmits the saved video file to the terminal device 11 in accordance with the transmission request from the terminal device 11 (S116), and ends the processing.

Meanwhile, when the transmission control unit 24 determines in step S106 that the communication connection with the communication network 6 is lost (S106, NO), the management unit 25 determines whether or not the predetermined timing has arrived (S118). As described above, the predetermined timing may be when the power switch 12 of the mobile unit 2 is switched from the on state to the off state and the transmission control unit 24 and the communication network 6 are in a communicable state.

Then, if the predetermined timing has not arrived (S118, NO), the management unit 25 repeats step S118 and waits for the predetermined timing to arrive.

Meanwhile, if the predetermined timing has arrived (S118, YES), the management unit 25 identifies an unreceived video file that has not been received by the recording server 4 among the video files saved to the storage device 9 (S120). As described above, the identification of the unreceived video file is based on the file number associated with the video file last transmitted by the transmission control unit 24 and the file number assigned to the video file last received by the recording server 4.

Subsequently, the management unit 25 instructs the transmission control unit 24 to transmit the identified unreceived video file, and the transmission control unit 24 transmits the instructed unreceived video file to the recording server 4 (S122). Thereafter, the recording server 4 executes steps S110, S112, S114, and S116 described above, and ends this processing.

Here, in FIG. 5, steps S102 and S108 correspond to a first step and a second step, respectively, in the present disclosure. In addition, steps S118 to S122 correspond to a third step in the present disclosure.

2. Other Embodiments

In the present embodiment, the "predetermined event" which is a trigger when the recording unit 23 stores the surrounding video as the video file is assumed to be the theft of the mobile unit 2, but the predetermined event is not limited to the theft. The predetermined event can be any event that can have some influence on the mobile unit 2 within the capture range of the camera mounted on the mobile unit 2. Such an event may be, in addition to the theft described above, contact or collision with an object that may damage a structure such as the body of the mobile unit 2, exposure to liquid that may contaminate the structure, unexpected movement of the mobile unit 2, and the like. The recording unit 23 can detect the occurrence of the above predetermined event on the basis of signals from various sensors according to the type of the predetermined event or information from a device that processes signals from those sensors.

Furthermore, the predetermined timing at which the management unit 25 identifies a video file not yet received by the recording server 4 may be when the communication connection between the transmission control unit 24 and the communication network 6 is lost and then restored, regardless of whether the power switch 12 of the mobile unit 2 is on or off. Whether or not the communication connection between the transmission control unit 24 and the communication network 6 has been lost and whether or not the communication connection has been restored can be determined on the basis of whether or not the radio field intensity of radio waves transmitted by the wireless communication device constituting the communication network 6 is less than a predetermined threshold value and whether or not the radio field intensity is equal to or greater than the predetermined threshold value, respectively.

However, as in the above-described embodiment, by setting the predetermined timing as when the power of the mobile unit 2 is switched from the on state to the off state and the transmission control unit 24 and the communication network 6 are in a communicable state, for example, in a case where the mobile unit 2 is stolen and moved and the mobile unit 2 stops at a location with a good communication environment, the unreceived video file can be immediately identified, and the identified video file can be transmitted to the external device.

In the above-described embodiment, the management unit 25 is provided in the video acquisition device 3 mounted on the mobile unit 2, but may be provided in the recording server 4. However, in a case where the management unit 25 is provided in the mobile unit 2 as in the above-described embodiment, the transmission management of the video file can be performed in the mobile unit 2 which is the transmission source of the video file of the surrounding video, and it is therefore possible to quickly identify a video file not yet received by the recording server 4 according to the state of the communication environment or the like of the mobile unit 2 and transmit the identified video file to the recording server 4.

Note that, in a case where the management unit 25 is provided in the recording server 4, the management unit 25 can receive a notification from the video acquisition device 3 that the power switch 12 of the mobile unit 2 has been switched from the on state to the off state, and can determine that the above-described predetermined timing has arrived when the notification is received. Furthermore, in this case, when the predetermined timing arrives, the management unit 25 can acquire, from the video acquisition device 3, the file number associated with the video file last transmitted by the transmission control unit 24 and identify the unreceived video file. Thereafter, the management unit 25 can instruct the video acquisition device 3 to transmit the identified unreceived video file.

Note that the present invention is not limited to the configuration of the above embodiments, and can be practiced in various embodiments without departing from the gist thereof.

3. Configuration Supported by Above Embodiments

The above embodiments support the following configurations.

(Configuration 1) A video recording system includes: a recording unit that saves a video file containing a video image of surroundings of a mobile unit to a storage device mounted on the mobile unit; a transmission control unit that transmits the video file to an external device disposed outside the mobile unit; and a management unit that manages transmission of the video file. The recording unit associates an ascending file number with the video file in ascending order of capture time, and stores the video file and the file number in the storage device. The transmission control unit assigns the file number associated with the video file to the video file and transmits the video file with the file number to the external device. The management unit identifies, at predetermined timing, an unreceived video file that has not been received by the external device, on a basis of the file number associated with the video file last transmitted by the transmission control unit and the file number assigned to the video file last received by the external device, and instructs the transmission control unit to transmit the unreceived video file.

The video recording system according to Configuration 1 makes it possible to easily identify a video file not yet received by the external device at predetermined timing so that the external device can receive the surrounding video without omission, even when a period of communication interruption may occur between the mobile unit and the external device.

(Configuration 2) The video recording system according to Configuration 1, in which the recording unit and the management unit are provided in the mobile unit.

With the video recording system according to Configuration 2, since the transmission management of the video file is performed in the mobile unit which is the transmission source of the video file of the surrounding video, it is possible to quickly identify the video file not yet received by the external device according to the state of the communication environment or the like of the mobile unit, and transmit the identified video file to the external device.

(Configuration 3) The video recording system according to Configuration 1 or 2, in which the transmission control unit communicates with the external device via a communication network disposed outside the mobile unit, and the predetermined timing is when power of the mobile unit is switched from an on state to an off state and the transmission control unit and the communication network are in a communicable state.

With the video recording system according to Configuration 3, when the mobile unit stops at a location with a good communication environment, the unreceived video file can be immediately identified, and the identified video file can be transmitted to the external device.

(Configuration 4) The video recording system according to any one of Configurations 1 to 3, in which the storage device is a memory removably connected to a device mounted on the mobile unit.

The video recording system according to Configuration 4 makes it possible to always ensure storage capacity for saving video files by replacing the removable memory.

(Configuration 5) The video recording system according to any one of Configurations 1 to 4, in which the management unit receives the file number assigned to the video file received by the external device, the file number being returned by the external device when the transmission control unit transmits the video file to the external device, and the management unit identifies the unreceived video file that has not been received by the external device, on the basis of the file number associated with the video file last transmitted by the transmission control unit and the file number last returned from the external device.

The video recording system according to Configuration 5 enables the identification of a video file not yet received by the external device, without communicating with the external device.

(Configuration 6) The video recording system according to any one of Configurations 1 to 4, in which the management unit acquires, at the predetermined timing, from the external device, information related to the file number assigned to the video file last received by the external device, and identifies the unreceived video file that has not been received by the external device, on the basis of the file number associated with the video file last transmitted by the transmission control unit and the file number obtained from the external device and assigned to the video file last received by the external device.

The video recording system according to Configuration 6 enables more reliable identification of a video file not yet received by the external device, through communication with the external device.

(Configuration 7) A video recording method executed by a computer of a video recording system includes: a first step for saving a video file containing a video image of surroundings of a mobile unit to a storage device mounted on the mobile unit; a second step for transmitting the video file to an external device disposed outside the mobile unit; and a third step for managing transmission of the video file. In the first step, an ascending file number is associated with the video file in ascending order of capture time, and the video file and the file number are stored in the storage device. In the second step, the file number associated with the video file is assigned to the video file, and the video file with the file number is transmitted to the external device. In the third step, at predetermined timing, an unreceived video file that has not been received by the external device is identified on a basis of the file number associated with the video file last transmitted in the second step and the file number assigned to the video file last received by the external device, and the unreceived video file is transmitted to the external device.

The video recording method according to Configuration 7 makes it possible to easily identify a video file not yet received by the external device at predetermined timing so that the external device can receive the surrounding video without omission, even when a period of communication interruption may occur between the mobile unit and the external device.

Reference Signs List

| | |
|---|---|
| 1 | video recording system |
| 2 | mobile unit |
| 3 | video acquisition device |
| 4 | recording server (external device) |
| 5 | first communication device |
| 6 | communication network |
| 7 | camera |
| 7a | front left camera |
| 7b | front right camera |
| 7c | rear left camera |
| 7d | rear right camera |
| 8 | audio-visual device |
| 9 | storage device |
| 10 | security device |
| 11 | terminal device |
| 12 | power switch |
| 20 | first processor |
| 21 | first memory |
| 22 | first program |
| 23 | recording unit |
| 24 | transmission control unit |
| 25 | management unit |
| 30 | second processor |
| 31 | second memory |
| 32 | storage device |
| 33 | second communication device |
| 34 | second program |
| 35 | reception control unit |
| 36 | video provision unit |
| 40 | third processor |
| 41 | third memory |
| 42 | touch panel |
| 43 | third communication device |

-continued

Reference Signs List

| | |
|---|---|
| 44 | third program |
| 45 | video reception unit |
| 46 | video playback unit |
| U | user |

What is claimed is:

1. A video recording system comprising:

a recording unit that saves a video file containing a video image of surroundings of a mobile unit to a storage device mounted on the mobile unit;

a transmission control unit that transmits the video file to an external device disposed outside the mobile unit; and a management unit that manages transmission of the video file, wherein the recording unit associates an ascending file number with the video file in ascending order of capture time, and stores the video file and the file number in the storage device, the transmission control unit assigns the file number associated with the video file to the video file and transmits the video file with the file number to the external device, the management unit identifies, at predetermined timing, an unreceived video file that has not been received by the external device, on a basis of the file number associated with the video file last transmitted by the transmission control unit and the file number assigned to the video file last received by the external device, and instructs the transmission control unit to transmit the unreceived video file, the transmission control unit communicates with the external device via a communication network disposed outside the mobile unit, and the predetermined timing is when power of the mobile unit is switched from an on state to an off state and the transmission control unit and the communication network are in a communicable state.

2. The video recording system according to claim 1, wherein the recording unit and the management unit are provided in the mobile unit.

3. The video recording system according to claim 1, wherein the storage device is a memory removably connected to a device mounted on the mobile unit.

4. The video recording system according to claim 1, wherein the management unit receives the file number assigned to the video file received by the external device, the file number being returned by the external device when the transmission control unit transmits the video file to the external device, and the management unit identifies the unreceived video file that has not been received by the external device, on the basis of the file number associated with the video file last transmitted by the transmission control unit and the file number last returned from the external device.

5. The video recording system according to claim 1, wherein the management unit acquires, at the predetermined timing, from the external device, information related to the file number assigned to the video file last received by the external device, and identifies the unreceived video file that has not been received by the external device, on the basis of the file number associated with the video file last transmitted by the transmission control unit and the file number obtained from the external device and assigned to the video file last received by the external device.

6. A video recording method executed by a computer of a video recording system, the video recording method comprising:

a first step for saving a video file containing a video image of surroundings of a mobile unit to a storage device mounted on the mobile unit;

a second step for transmitting the video file, using a transmission control unit, to an external device disposed outside the mobile unit; and a third step for managing transmission of the video file, wherein in the first step, an ascending file number is associated with the video file in ascending order of capture time, and the video file and the file number are stored in the storage device, in the second step, the file number associated with the video file is assigned to the video file, and the video file with the file number is transmitted to the external device, in the third step, at predetermined timing, an unreceived video file that has not been received by the external device is identified on a basis of the file number associated with the video file last transmitted in the second step and the file number assigned to the video file last received by the external device, and the unreceived video file is transmitted to the external device, in the second step, the transmission control unit communicates with the external device via a communication network disposed outside the mobile unit, and the predetermined timing is when power of the mobile unit is switched from an on state to an off state and the transmission control unit and the communication network are in a communicable state.

* * * * *